US012163494B2

(12) United States Patent
Dudar et al.

(10) Patent No.: US 12,163,494 B2
(45) Date of Patent: Dec. 10, 2024

(54) METHOD AND SYSTEM FOR DIAGNOSING WORKING CAPACITY OF CARBON FILLED CANISTERS

(71) Applicant: Ford Global Technologies, LLC, Dearborn, MI (US)

(72) Inventors: Aed Dudar, Canton, MI (US); Scott Alan Bohr, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 18/305,631

(22) Filed: Apr. 24, 2023

(65) Prior Publication Data

US 2024/0352909 A1 Oct. 24, 2024

(51) Int. Cl.
*F02M 25/08* (2006.01)

(52) U.S. Cl.
CPC .... *F02M 25/0854* (2013.01); *F02M 25/0809* (2013.01); *F02M 25/0836* (2013.01)

(58) Field of Classification Search
CPC .. F02M 25/089; F02M 25/08; F02M 25/0809; F02M 25/0836; F02M 25/0854; F02M 25/0872; F02D 41/003; F02D 41/004; F02D 41/0045; F02D 2041/224; F02D 41/0032; F02D 41/22; B60W 50/0205
See application file for complete search history.

(56) References Cited

U.S. PATENT DOCUMENTS

| | | | | | |
|---|---|---|---|---|---|
| 5,251,477 | A * | 10/1993 | Nakashima | F02M 25/0809 | 73/114.39 |
| 5,368,002 | A * | 11/1994 | Hoshino | F02D 41/0045 | 123/198 D |
| 5,656,765 | A * | 8/1997 | Gray | F02D 41/1441 | 73/114.73 |
| 6,874,485 | B2 * | 4/2005 | Fujimoto | F02D 41/0045 | 73/114.39 |
| 9,546,602 | B2 | 1/2017 | Julliard et al. | | |
| 9,822,718 | B2 | 11/2017 | Pursifull et al. | | |
| 10,830,189 | B1 | 11/2020 | Dudar | | |
| 11,104,222 | B2 | 8/2021 | Dudar | | |
| 11,293,381 | B1 * | 4/2022 | Dudar | F02D 41/065 | |
| 11,333,095 | B1 | 5/2022 | Dudar | | |
| 11,585,298 | B1 | 2/2023 | Dudar et al. | | |
| 2016/0160808 | A1 * | 6/2016 | Dudar | F02D 41/004 | 701/104 |
| 2017/0130659 | A1 * | 5/2017 | Dudar | F02M 25/0836 | |
| 2018/0058384 | A1 * | 3/2018 | Dudar | F02D 41/221 | |
| 2020/0369508 | A1 * | 11/2020 | Dudar | B60K 15/03504 | |
| 2022/0212161 | A1 * | 7/2022 | Alden | F02M 25/0854 | |

FOREIGN PATENT DOCUMENTS

| | | | | |
|---|---|---|---|---|
| CN | 103807042 A * | 5/2014 | | F02D 41/0042 |

* cited by examiner

*Primary Examiner* — George C Jin
*Assistant Examiner* — Teuta B Holbrook
(74) *Attorney, Agent, or Firm* — Vincent Mastrogiacomo; McCoy Russell LLP

(57) ABSTRACT

Methods and systems are presented for onboard fuel vapor recovery for large heavy duty vehicles. In one example, the methods and systems include combining a plurality of carbon filled fuel vapor storage canisters in parallel and series to capture fuel vapors that may be generated via a heavy duty vehicle.

13 Claims, 8 Drawing Sheets

500

| | 520 | 521 | 522 | 523 | 524 | 525 | 526 |
|---|---|---|---|---|---|---|---|
| 502 | Bed volume | $O_2$ sensor state | CPV state | CVV1 state | CVV2 state | CVV3 state | Inference |
| 503 | 20>BV>0 | Lean | Open | Open | Open | Closed | 1 & 2 degraded |
| 504 | 360>BV>160 | Rich to lean | Open | Open | Open | Closed | 1 or 2 degraded |
| 505 | BV>360 | Rich to lean | Open | Open | Open | Closed | 1 & 2 good |
| 506 | 20>BV>0 | Lean | Open | Open | Closed | Open | 1 & 3 degraded |
| 507 | 360>BV>160 | Rich to lean | Open | Open | Closed | Open | 1 or 3 degraded |
| 508 | BV>360 | Rich to lean | Open | Open | Closed | Open | 1 & 3 good |

FIG. 5

600

| | 620 | 621 | 622 | 623 | 624 | 625 | 626 |
|---|---|---|---|---|---|---|---|
| 602 | Bed volume | $O_2$ sensor state | CPV state | CVV1 state | CVV2 state | CVV3 state | Inference |
| 603 | 20>BV>0 | Lean | Open | Open | Closed | Open | 1 & 3 degraded |
| 604 | 360>BV>160 | Rich to lean | Open | Open | Closed | Open | 1 or 3 degraded |
| 605 | BV>360 | Rich to lean | Open | Open | Closed | Open | 1 & 3 good |
| 606 | 20>BV>0 | Lean | Open | Closed | Open | Open | 2 & 3 degraded |
| 607 | 360>BV>160 | Rich to lean | Open | Closed | Open | Open | 2 or 3 degraded |
| 608 | BV>360 | Rich to lean | Open | Closed | Open | Open | 2 & 3 good |

FIG. 6

METHOD AND SYSTEM FOR DIAGNOSING WORKING CAPACITY OF CARBON FILLED CANISTERS

FIELD

The present description relates generally to methods and systems for evaluating operation of a plurality of carbon filled fuel vapor storage canisters.

BACKGROUND/SUMMARY

Heavy duty vehicles may include large fuel tanks to store fuel so that they may operate at high loads for long trips. The volume of the large fuel tank may contribute to a large amount of fuel vapor being generated when the fuel tank is being filled. In order to ensure that the large amount of fuel vapor that is generated during fuel tank filling and other conditions is not released to atmosphere, a carbon filled fuel vapor storage canister may be selectively fluidically coupled to the heavy duty vehicle's fuel tank. The carbon filled fuel vapor storage canister volume is proportional to the size of the vehicle's fuel tank volume. Thus, the volume of the carbon filled fuel vapor storage canister increases as fuel tank volume increases. However, it may be difficult to find contiguous space in a vehicle for mounting a large carbon filled fuel vapor storage canister. Further, large carbon filled fuel vapor storage canisters may exhibit increased restriction to fuel vapor flow which can lead to reduced fuel tank filling capacity that is due to the pressure building in the fuel tank.

The inventors herein have recognized the above-mentioned issue and have developed a method for operating a vehicle, comprising: arranging a plurality of carbon filled fuel vapor storage canisters in parallel and series; and via a controller, indicating a presence or absence of degradation for each of the plurality of carbon filled fuel vapor storage canisters according to a state of an oxygen sensor and a plurality of ranges of volume amounts.

By arranging carbon filled fuel vapor storage canisters in parallel and series, restriction of flow in a fuel vapor emissions storage system may be reduced so that fuel vapors of a heavy duty vehicle may be retained. In particular, fuel vapor storage capacity may be increased by increasing an actual total number of carbon filled canisters in a fuel vapor emissions storage system. Further, resistance to flow of gases in the fuel vapor emissions storage system may be reduced by arranging the carbon filled fuel vapor storage canisters in parallel. Additionally, fuel vapor storage capacity of each carbon filled fuel vapor storage canister may be evaluated according to an operating state of an oxygen sensor and a plurality of ranges of volume amounts. For example, if a state of an oxygen sensor switches from rich to lean when a predetermined volume of air has passed through the plurality of carbon filled fuel vapor storage canisters, then one or more of the carbon filled fuel vapor storage canisters may be determined to be degraded or not degraded.

The present description may provide several advantages. In particular, the approach may provide a desired level of vapor trapping for a heavy duty vehicle. Additionally, the approach provides a method to determine whether or not one or more carbon filled fuel vapor storage canisters is degraded. Further, the approach may allow a fuel vapor storage system to selectively choose carbon filled canisters in which fuel vapor is stored so that there may be a lower possibility of releasing fuel vapors to atmosphere.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5 and 6 show example matrices for diagnosing carbon filled canisters according to the method of FIGS. 7 and 8.

DETAILED DESCRIPTION

Figure 1:
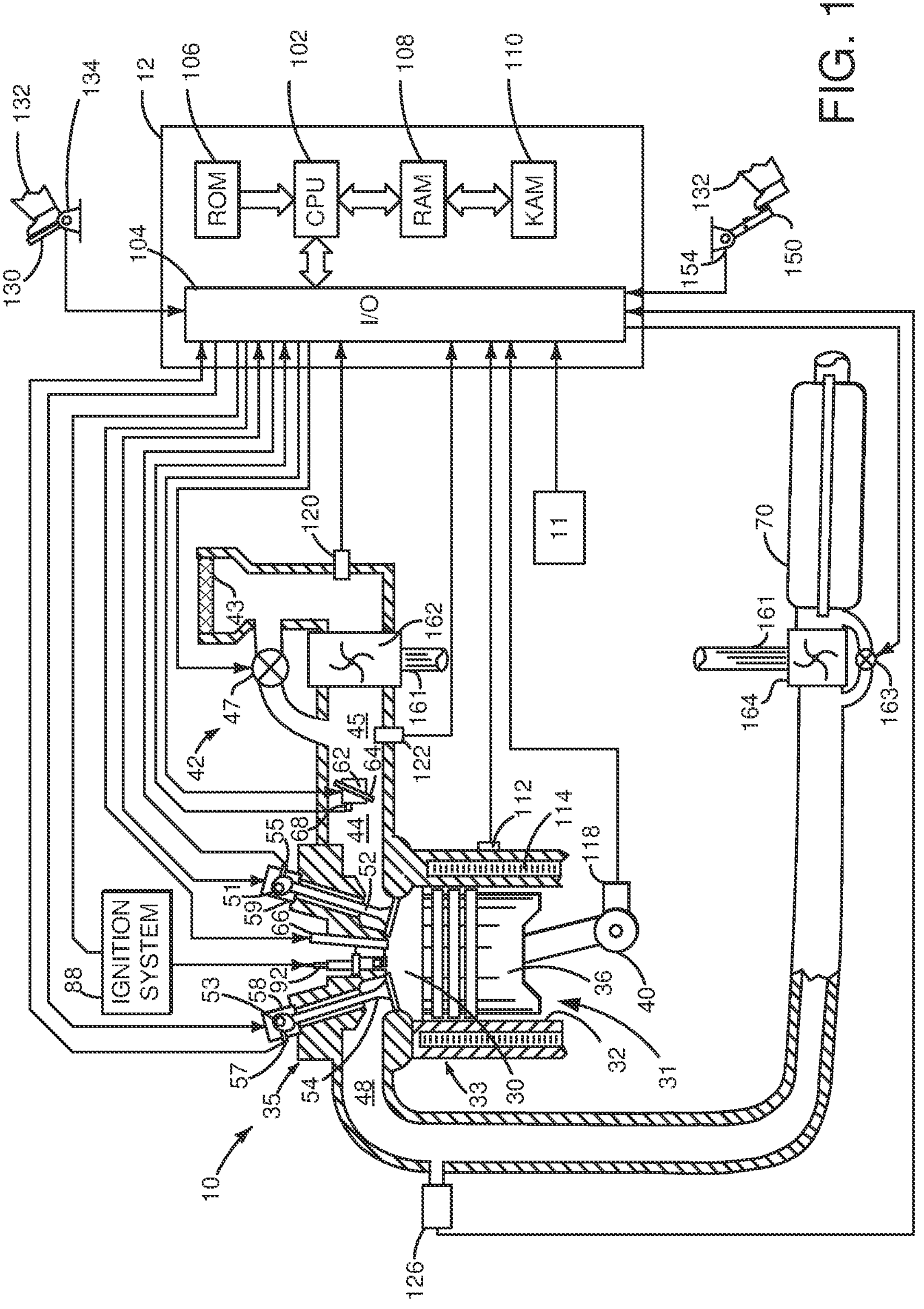
FIG. 1 shows an example engine to which an evaporative emissions system may be coupled.
Figure 2:
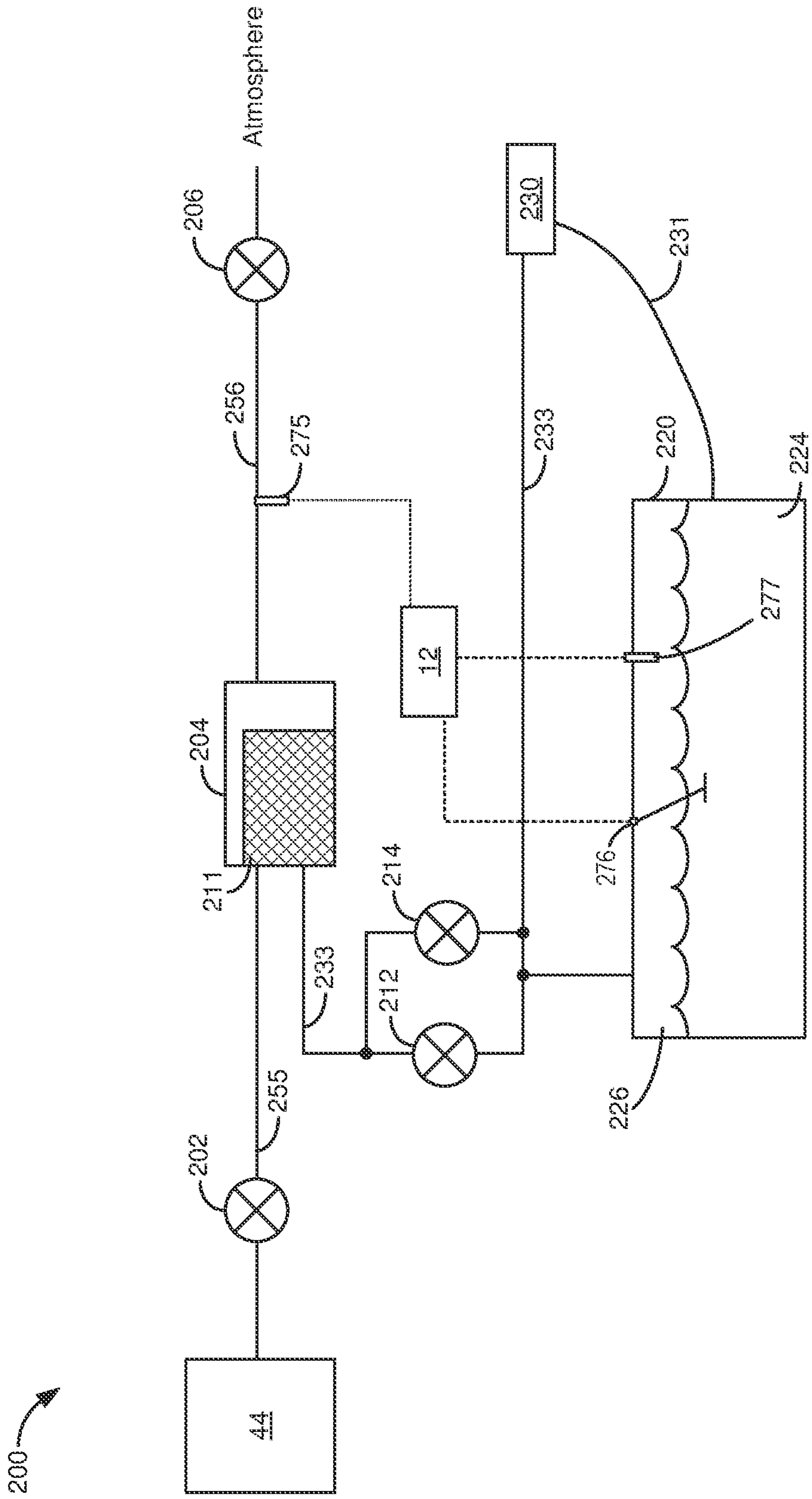
PRIOR ART FIG. 2
FIG. 2 shows an example prior art evaporative emissions system.
Figure 7:
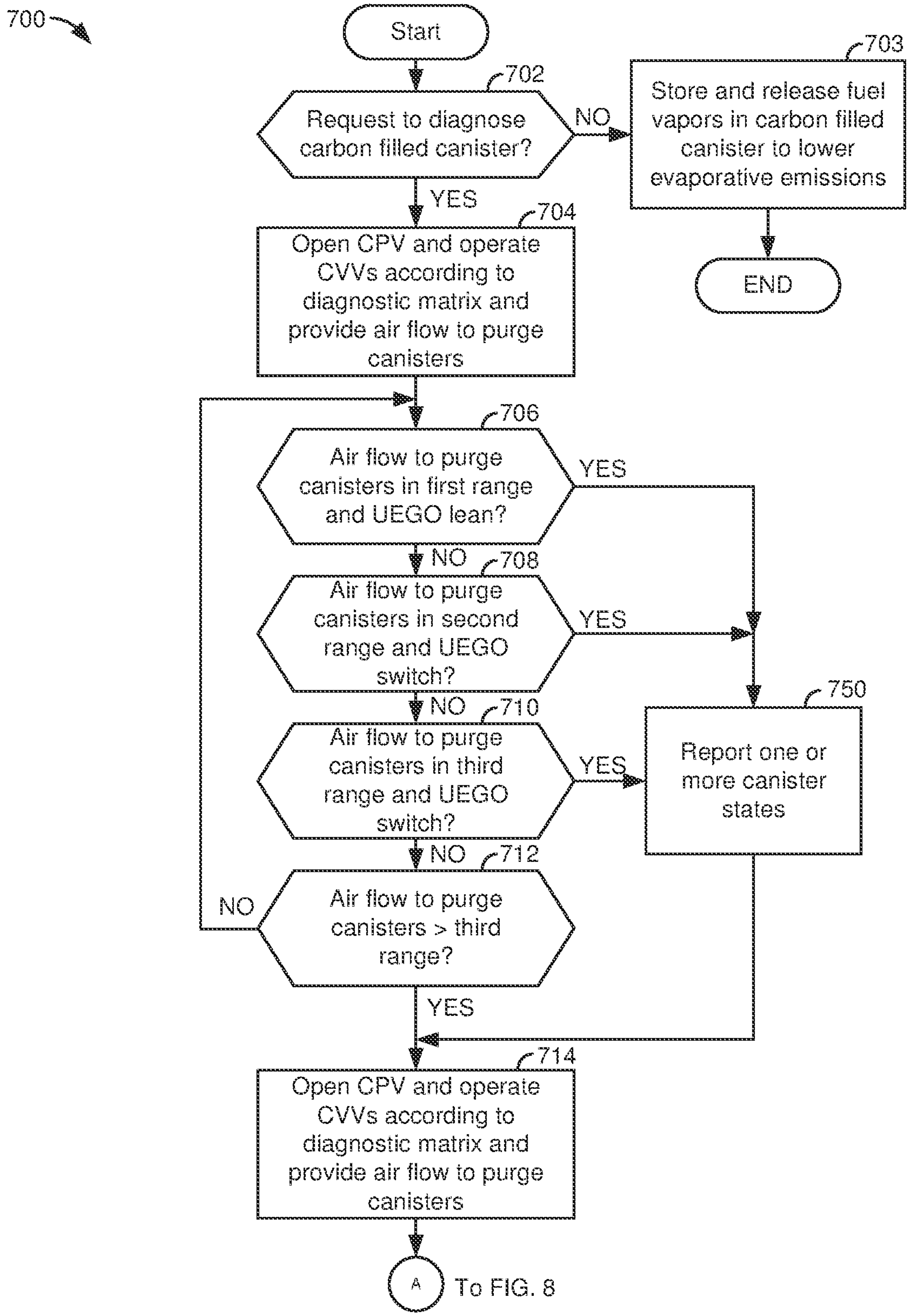
FIGS. 7 and 8 show an example method for operating and diagnosing an evaporative emissions system of a vehicle.
Figure 8:
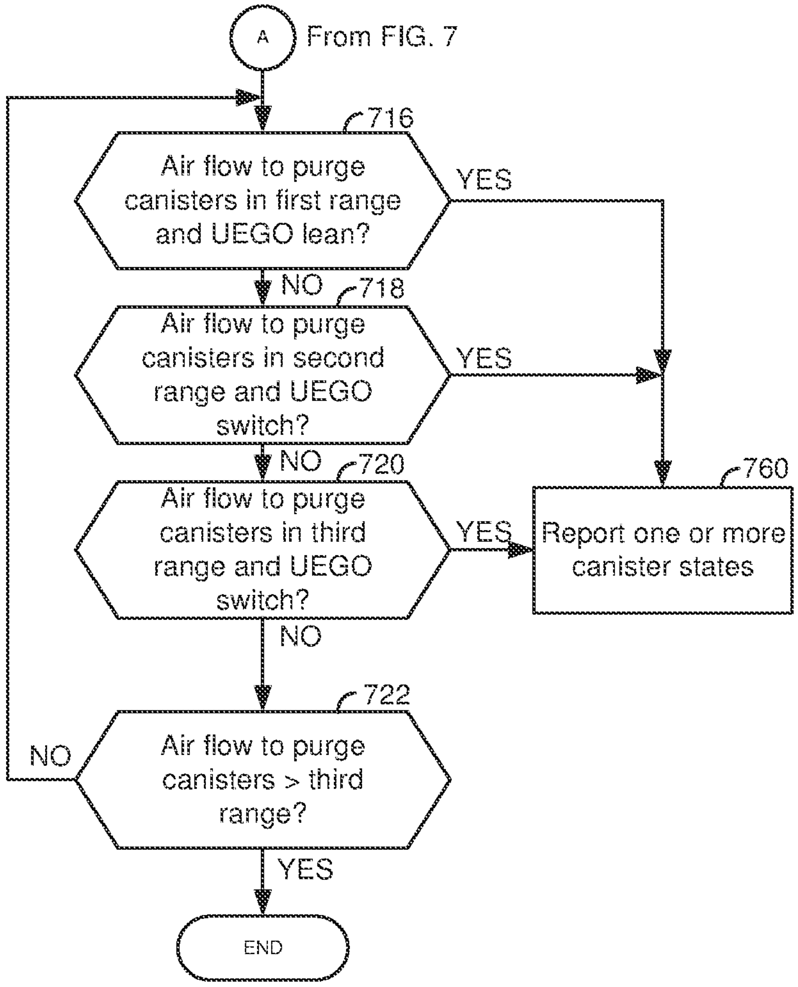

The following description relates to systems and methods for operating a vehicle and an evaporative emissions system. The vehicle may be a heavy duty vehicle that has a large fuel tank. The vehicle may include an engine of the type that is shown in FIG. 1. A prior art evaporative emissions system is shown in FIG. 2. Example evaporative emissions systems according to the present disclosure are shown in FIGS. 5 and 6. An example method for operating the evaporative emissions systems disclosed herein is shown in FIGS. 7 and 8.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1, 3, and 4 to adjust engine and evaporative emissions system operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Fuel injector 66 is shown protruding into combustion chamber 30 and it is positioned to inject fuel directly into cylinder 31, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a demand (e.g., torque or power) applied by human driver 132; a position sensor 154 coupled to brake pedal 150 for sensing a braking demand (e.g., torque) applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a block diagram of an example prior art evaporative emissions system 200 is shown. Evaporative emissions system 200 includes a canister purge valve 202, a carbon filled fuel vapor storage canister 204, a canister vent valve 206, a fuel tank pressure sensor 277, a fuel tank level sensor 276, a fuel cap 230, a fuel tank pressure control valve 212, a hydrocarbon sensor 275, and a refueling valve 214. In some examples, a leak detection module including a pump and change over valve may replace vent valve 206. Carbon filled fuel vapor storage canister 204 may include activated carbon 211 to store fuel vapors. Fuel tank pressure control valve 212 and refueling valve 214 are shown in fluidic communication with carbon filled fuel vapor storage canister 204 and fuel tank 220 via conduit 233. Fuel may flow from fuel cap 230 to fuel tank 220 via filler neck pipe 231. Carbon filled fuel vapor storage canister 204 may be in selective fluidic communication with intake manifold 44 via conduit 255 and canister purge valve 202.

During refilling of fuel tank 220, the refueling valve 214 and the canister vent valve 206 may be opened so that fuel vapors may exit fuel tank 220, pass though conduit 233, and be stored in carbon filled fuel vapor storage canister 204. Air that has been stripped of hydrocarbons may flow from carbon filled fuel vapor storage canister 204 to atmosphere via conduit or passage 256 and vent valve 206.

Carbon filled fuel vapor storage canister 204 may be purged of fuel vapors by opening canister purge valve 202, fully closing fuel tank pressure control valve 212, fully closing refueling valve 214, and opening canister vent valve 206. In particular, low pressure in engine intake manifold 44 may draw fuel vapors from carbon filled canister when canister purge valve 202 and canister vent valve are opened. Fresh air drawn in from atmosphere may cause fuel vapors to desorb from the carbon filled fuel vapor storage canister.

Figure 3:
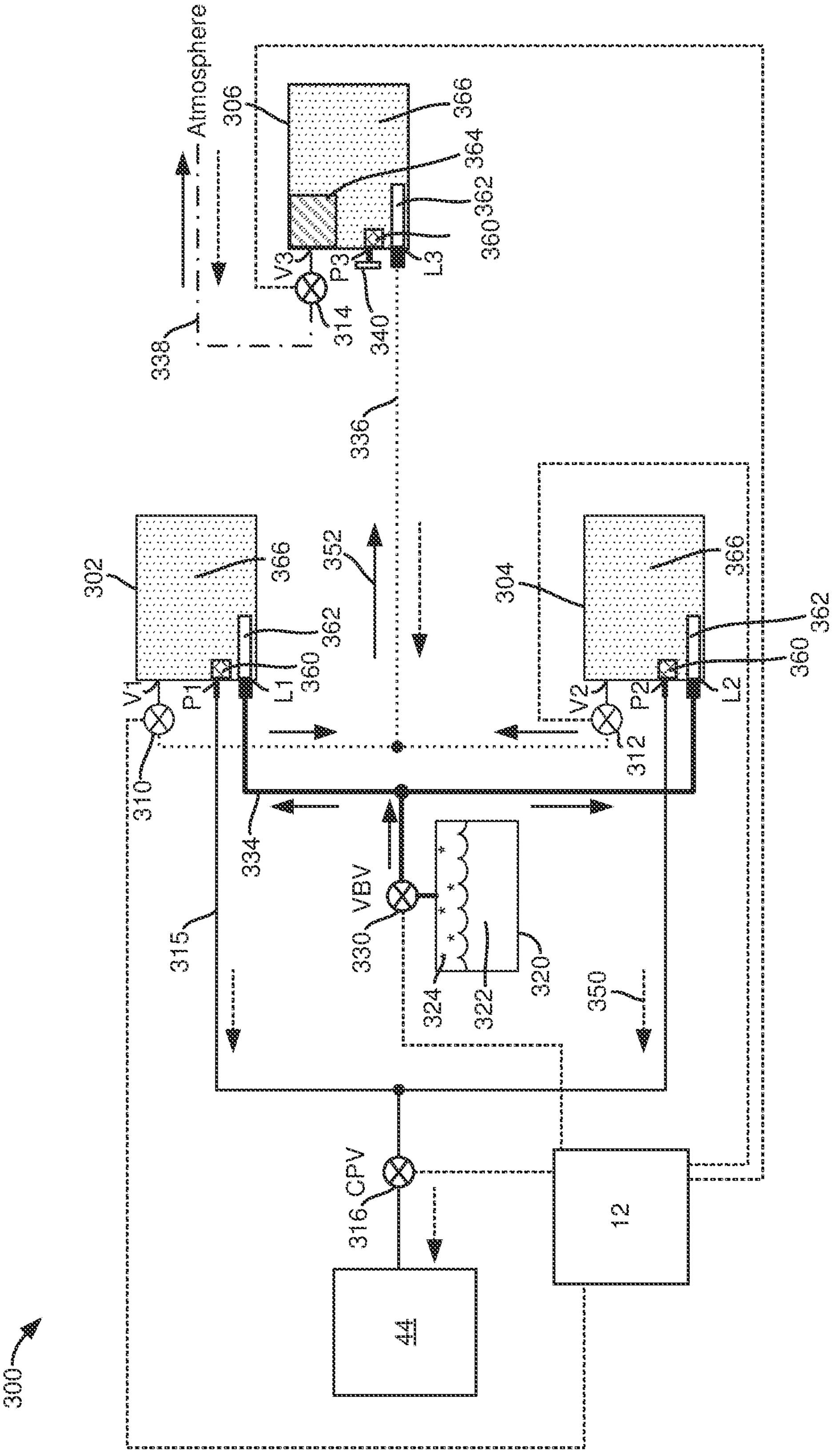
FIGS. 3 and 4 show example evaporative emissions systems according to the present disclosure.

Referring now to FIG. 3, a schematic view of a first example evaporative emissions system 300 is shown. Evaporative emissions system 300 may temporarily capture fuel vapors in one or more of carbon filled fuel vapor storage canisters 302, 304, and 306. First carbon filled fuel vapor storage canister 302 is arranged in parallel with second carbon filled fuel vapor storage canister 304. Third carbon filled fuel vapor storage canister 306 is arranged in series with first carbon filled fuel vapor storage canister 302 and second carbon filled fuel vapor storage canister 304.

Fuel vapors 324 may be generated in fuel tank via fuel 322 sloshing around and by filling fuel tank 320 with fuel. Fuel vapors 324 in fuel tank 320 may be released via vapor blocking valve 330 (VBV). Conduit or passage 334 may put vapor blocking valve 330 in fluidic communication with load port L1 of first carbon filled fuel vapor storage canister 302 and load port L2 of second carbon filled fuel vapor storage canister 304. Fuel vapors flow in the direction that is indicated by solid arrows 352 when fuel vapors are in the process of being stored in the carbon filled fuel vapor storage canisters. Thus, fuel vapors may flow from fuel tank 320 to first carbon filled fuel vapor storage canister 302 and second carbon filled fuel vapor storage canister 304. If one or both of first carbon filled fuel vapor storage canister 302 and second carbon filled fuel vapor storage canister 304 are filled with fuel vapors, fuel vapors may exit these canisters and flow into third carbon filled fuel vapor storage canister 306. Conduit or passage 336 may put vent port V1 of first carbon filled fuel vapor storage canister 302 and vent port V2 of second carbon filled fuel vapor storage canister 304 in fluidic communication with load port L3 of third carbon filled fuel vapor storage canister 306. Canister vent valve 310 (e.g., CVV1) may allow selective communication between vent port V1 and conduit or passage 336. Likewise, canister vent valve 312 (e.g., CVV2) may allow selective communication between vent port V2 and conduit or passage 336. Canister vent valve 314 (e.g., CVV3) may allow selective communication between vent port V3 and atmosphere via conduit or passage 338. Load port L3 is covered via cap 340.

Fuel vapors 324 stored in the carbon filled canisters may be purged and combusted in engine 10 (shown in FIG. 1) by opening canister purge valve 316. A lower pressure (e.g., a vacuum) in intake manifold 44 may draw fuel vapors from purge port P1 of first carbon filled fuel vapor storage canister 302 and purge port P2 of second carbon filled fuel vapor storage canister 304 simultaneously by virtue of their parallel connection configuration. At the same time, canister vent valves V1, V2, and V3 may be opened so that fuel vapors may be drawn from load port L3 of third carbon filled fuel vapor storage canister 306 and into the vent port V1 of first carbon filled fuel vapor storage canister 302 and vent port V2 of second carbon filled fuel vapor storage canister 304.

Controller 12 may control canister purge valve 316, vapor blocking valve 330, canister vent valve 310, canister vent valve 312, and canister vent valve 314. The dashed lines represent electrical connections between controller 12 and the controlled valves.

Each of the carbon filled fuel vapor storage canisters may include a buffer 362 and a filter 360. Filter 360 reduces migration of carbon dust out of a carbon filled canister. Buffer 362 is an area in the canister that causes fuel vapors that enters a load port from immediately exiting via a purge port so that the possibility of drawing a large fuel vapor slug into the engine may be reduced. In this example, third carbon filled fuel vapor storage canister 306 includes a dust box that extracts dust and debris from fresh air. First carbon filled fuel vapor storage canister 302 and second carbon filled fuel vapor storage canister 304 do not include dust boxes. This is so because eliminating the dust boxes improves flow through the canisters and the fresh air has already been filtered in the third carbon filled fuel vapor storage canister.

Figure 4:
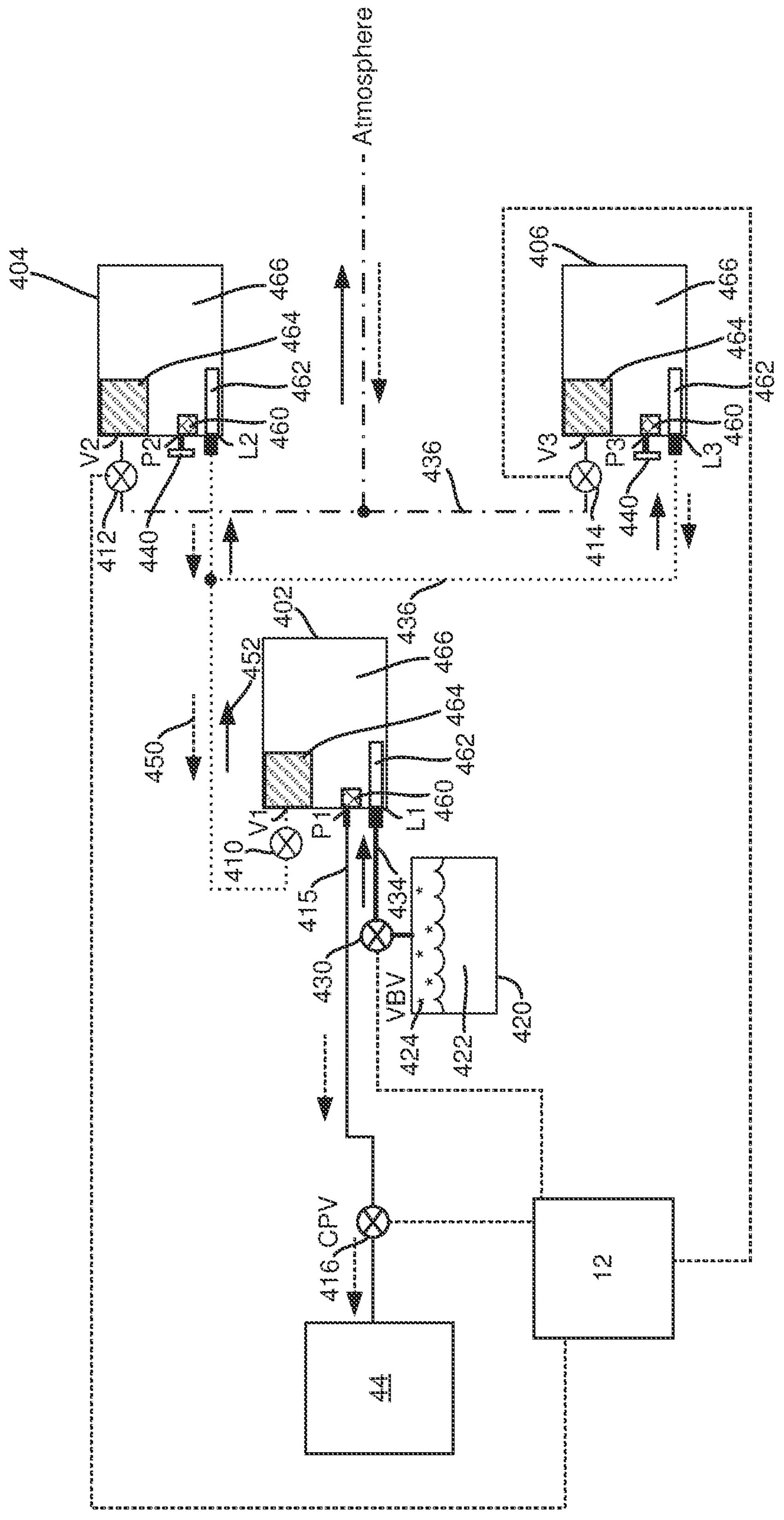

Referring now to FIG. 4, a schematic view of a second example evaporative emissions system 400 is shown. Evaporative emissions system 400 may temporarily capture fuel vapors in one or more of carbon filled fuel vapor storage canisters 402, 404, and 406. First carbon filled fuel vapor storage canister 402 is arranged in series with second carbon filled fuel vapor storage canister 404 and third carbon filled fuel vapor storage canister 406. Second carbon filled fuel vapor storage canister 404 is arranged in parallel with third carbon filled fuel vapor storage canister 406.

Fuel vapors 424 may be generated in fuel tank via fuel 422 sloshing around and by filling fuel tank 420 with fuel. Fuel vapors 424 in fuel tank 420 may be released via vapor blocking valve 430 (VBV). Conduit or passage 434 may put vapor blocking valve 430 in fluidic communication with load port L1 of first carbon filled fuel vapor storage canister 402. Fuel vapors flow in the direction that is indicated by solid arrows 452 when fuel vapors are in the process of being stored in the carbon filled fuel vapor storage canisters. Thus, fuel vapors may flow from fuel tank 420 to first carbon filled fuel vapor storage canister 402. If first carbon filled fuel vapor storage canister 402 is filled with fuel vapors, fuel vapors may exit this canister and flow into second carbon filled fuel vapor storage canister 404 and third carbon filled fuel vapor storage canister 406. Conduit or passage 436 may put vent port V1 of first carbon filled fuel vapor storage canister 402 in fluidic communication with load port L2 of second carbon filled fuel vapor storage canister 404 load port L3 of third carbon filled fuel vapor storage canister 406. First canister vent valve 410 (e.g., CVV1) may allow selective communication between vent port V1 and conduit or passage 436. Second canister vent valve 412 (e.g., CVV2) may allow selective communication between vent port V2 and atmosphere via conduit or passage 436. Similarly, third canister vent valve 414 (e.g., CVV3) may allow selective communication between vent port V3 and atmosphere via conduit or passage 436.

Fuel vapors 424 stored in the carbon filled canisters may be purged and combusted in engine 10 (shown in FIG. 1) by opening canister purge valve 416. A lower pressure (e.g., a vacuum) in intake manifold 44 may draw fuel vapors from purge port P1 of first carbon filled fuel vapor storage canister 402. At the same time, canister vent valves V1, V2, and V3 may be opened so that fuel vapors may be drawn from second carbon filled fuel vapor storage canister 404 and third carbon filled fuel vapor storage canister 406 into the vent port V1 of first carbon filled fuel vapor storage canister 402. Thus, fuel vapors may flow from second carbon filled fuel vapor storage canister 404 and third carbon filled fuel vapor storage canister 406 into first carbon filled fuel vapor storage canister 402.

Controller 12 may control canister purge valve 416, vapor blocking valve 430, first canister vent valve 410, second canister vent valve 412, and third canister vent valve 414. The dashed lines represent electrical connections between controller 12 and the controlled valves.

Each of the carbon filled fuel vapor storage canisters may include a buffer 462 and a filter 460. Filter 460 reduces migration of carbon dust out of a carbon filled canister. Buffer 462 is an area in the canister that causes fuel vapors that enters a load port from immediately exiting via a purge port so that the possibility of drawing a large fuel vapor slug into the engine may be reduced. In this example, second carbon filled fuel vapor storage canister 404 and third carbon filled fuel vapor storage canister 406 include a dust box 464 that extracts dust and debris from fresh air. First carbon filled fuel vapor storage canister 402 does not include a dust box. This is so because eliminating the dust box in the first carbon filled fuel vapor storage canister 402 improves flow through the canisters and the fresh air has already been filtered in the second carbon filled fuel vapor storage canister 404 and the third carbon filled fuel vapor storage canister 406.

Thus, the system of FIGS. 1, 3, and/or 4 provides for a vehicle system, comprising: a plurality of carbon filled fuel vapor storage canisters including a first group of carbon filled fuel vapor storage canisters arranged in parallel and a second group of carbon filled fuel vapor storage canisters arranged in series; a fuel tank; an oxygen sensor; a canister purge valve; a first canister vent valve, a second canister vent valve, and a third canister vent valve; and a controller including executable instructions stored in non-transitory memory that cause the controller to indicate a presence or absence of degradation for each of the plurality of carbon filled fuel vapor storage canisters in response to a request to diagnose the plurality of carbon filled fuel vapor storage canisters. In a first example, the vehicle system includes where the presence or absence of degradation for each of the plurality of carbon filled fuel vapor storage canisters is based on a state of the oxygen sensor and a plurality of ranges of air amounts. In a second example that may include the first example, the vehicle system includes where a state of the oxygen sensor remains indicating a lean air-fuel ratio. In a third example that may include one or both of the first and second examples, the vehicle system includes where a state of the oxygen sensor switches from indicating a rich air-fuel ratio to indicating a lean air-fuel ratio. In a fourth example that may include one or more of the first through third examples, the vehicle system further comprises additional executable instructions to open the canister purge valve, open the first canister vent valve, close the second canister vent valve, and open the third canister vent valve in response to the request to diagnose the plurality of carbon filled fuel vapor storage canisters in a first diagnostic phase. In a fifth example that may include one or more of the first though fourth examples, the vehicle system further comprises additional executable instructions to hold open the canister purge valve, close the first canister vent valve, open the second canister vent valve, and hold open the third canister vent valve in response to the request to diagnose the plurality of carbon filled fuel vapor storage canisters in a second diagnostic phase. In a sixth example that may include one or more of the first through fifth examples, the vehicle system includes where the first group of carbon filled fuel vapor storage canisters are in direct fluidic communication with the canister purge valve.

Referring now to FIG. 5, a matrix 500 for diagnosing a vapor storage capacity of a carbon filled fuel vapor storage canisters that are arranged in series and parallel in a first evaporative emissions system is shown. In particular, matrix 500 describes how a canister purge valve and canister vent valves of the fuel vapor control system shown in FIG. 4 are to be controlled during canister diagnostics. Matrix 500 also indicates what inferences may be made based on the amount of gas flow through the carbon filled fuel vapor storage canisters and oxygen sensor state. The matrix of FIG. 5 may be utilized via the method of FIGS. 7 and 8 to diagnose operation of a plurality of carbon filled fuel vapor storage canisters that are arranged in series and parallel. Rows 2-4 represent bed volumes, valves states, and inferences that may be provided during a first phase of diagnosing an evaporative emissions system. Rows 5-7 represents be volumes, valve states, and inferences that may be provided during a second phase of diagnosing an evaporative emissions system.

Matrix 500 includes a first row 502, second row 503, and so on up to seventh row 508. Matrix 500 also includes a first column 520, a second column 521, and so on up to seventh column 526. The actual total number of rows and columns may be dependent of the evaporative emissions system configuration.

The first row and associated columns describe the devices and conditions for the second to eighth rows. For example, the first row and first column cell reads "Bed volume" and it describes a volume of fresh air that is flowed through a carbon filled canister. Further, "Bed volume" corresponds to a gas or air volume that is equivalent to the internal volume of one of the carbon filled canisters in the evaporative emissions control system. Thus, if a volume of one of the carbon filled fuel vapor storage canisters is 1 liter, one bed volume is one liter of air at predetermined operating conditions (e.g., standard temperature and pressure, or at the present ambient temperature and pressure). The "Bed volume" that is indicated at the first row and first column of matrix 500 identifies that subsequent rows falling under column one bound ranges of bed volumes of gas or air that flow through the evaporative emissions system during a phase of a diagnostic. For example, row two, column one represents between 0 and 20 bed volumes.

The first row and second column cell reads "$O_2$ sensor state" and it describes an operating state that an oxygen sensor in the engine's exhaust system may assume during a diagnostic. The $O_2$ sensor state may indicate lean, rich, an indication change from rich to lean, or an indication change from lean to rich. The "$O_2$ sensor state" that is indicated at the first row and second column of matrix 500 identifies that subsequent rows falling under column two are indicating an operating state of an $O_2$ sensor. For example, row two, column two represents a lean indication by the oxygen sensor.

The first row and third column cell reads "CPV state" and it describes an operating state that the canister purge valve (CPV) is commanded to during a diagnostic. The CPV state may indicate open or closed. The "CPV state" that is indicated at the first row and third column of matrix 500 identifies that subsequent rows falling under column three indicate the state that the CPV is commanded to during the diagnostic. For example, row two, column three represents that the CPV is to be open.

The first row and fourth column cell reads "CVV1 state" and it describes an operating state that the canister vent valve one (e.g., 410 of FIG. 4) is commanded to during a diagnostic. The CVV1 state may indicate open or closed. The "CVV1" state" that is indicated at the first row and fourth column of matrix 500 identifies that subsequent rows falling under column three indicate the state that the CVV1 is commanded to during the diagnostic. For example, row two, column three represents that the CVV1 is to be open.

The first row and fifth column cell reads "CVV2 state" and it describes an operating state that the canister vent valve two (e.g., 412 of FIG. 4) is commanded to during a diagnostic. The CVV2 state may indicate open or closed. The "CVV2" state" that is indicated at the first row and fifth column of matrix 500 identifies that subsequent rows falling under column three indicate the state that the CVV2 is commanded to during the diagnostic. For example, row two, column three represents that the CVV2 is to be open.

The first row and sixth column cell reads "CVV3 state" and it describes an operating state that the canister vent valve three (e.g., 414 of FIG. 4) is commanded to during a diagnostic. The CVV3 state may indicate open or closed. The "CVV3" state" that is indicated at the first row and sixth column of matrix 500 identifies that subsequent rows falling under column three indicate the state that the CVV3 is commanded to during the diagnostic. For example, row two, column three represents that the CVV3 is to be closed.

The first row and seventh column cell reads "Inference" and it describes an inference that may be determined during a diagnostic. The inference may state which carbon filled fuel vapor storage canister is degraded or not degraded. The "Inference" that is indicated at the first row and seventh column of matrix 500 identifies that subsequent rows falling under column seven indicate what inference (e.g., a carbon filled fuel vapor storage canister one is degraded or not degraded) may be determined based on the state of bed volume, $O_2$ sensor state, CPV valve state, and CVV states. For example, row three, column seven, indicates that carbon filled fuel vapor storage canister number one or carbon filled fuel vapor storage canister two may be degraded.

A representation of matrix 500 may be stored in controller ROM and a method, such as method 700, may reference matrix 500 to determine which valves to command to command to which state and what inferences may be inferred from bed volume, $O_2$ sensor state, CPV state, and CVV states.

Referring now to FIG. 6, a matrix 600 for diagnosing fuel vapor storage capacity of a carbon filled fuel vapor storage canisters that are arranged in series and parallel in a second evaporative emissions system is shown. In particular, matrix 600 describes how a canister purge valve and canister vent valves of the fuel vapor control system shown in FIG. 3 are to be controlled during canister diagnostics. Matrix 600 also indicates what inferences may be made based on the amount of gas flow through the carbon filled fuel vapor storage canisters and oxygen sensor state. The matrix of FIG. 6 may be utilized via the method of FIGS. 7 and 8 to diagnose operation of a plurality of carbon filled fuel vapor storage canisters that are arranged in series and parallel. Rows 2-4 represent bed volumes, valves states, and inferences that may be provided during a first phase of diagnosing an evaporative emissions system. Rows 5-7 represents be volumes, valve states, and inferences that may be provided during a second phase of diagnosing an evaporative emissions system.

Matrix 600 includes a first row 602, second row 603, and so on up to seventh row 608. Matrix 600 also includes a first column 620, a second column 621, and so on up to seventh column 626. The actual total number of rows and columns may be dependent of the evaporative emissions system configuration.

The first row and associated columns describe the devices and conditions for the second to eighth rows. For example, the first row and first column cell reads "Bed volume" and it describes a volume of fresh air that is flowed through a carbon filled canister. Further, "Bed volume" corresponds to a gas or air volume that is equivalent to the internal volume of one of the carbon filled canisters in the evaporative emissions control system. Thus, if a volume of one of the carbon filled fuel vapor storage canisters is 1 liter, one bed volume is one liter of air at predetermined operating conditions (e.g., standard temperature and pressure, or at the present ambient temperature and pressure). The "Bed volume" that is indicated at the first row and first column of matrix 600 identifies that subsequent rows falling under column one bound ranges of bed volumes of gas or air that flow through the evaporative emissions system during a phase of a diagnostic.

The first row and second column cell reads "$O_2$ sensor state" and it describes an operating state that an oxygen sensor in the engine's exhaust system may assume during a diagnostic. The $O_2$ sensor state may indicate lean, rich, an indication change from rich to lean, or an indication change from lean to rich. The "$O_2$ sensor state" that is indicated at the first row and second column of matrix 600 identifies that subsequent rows falling under column two are indicating an operating state of an $O_2$ sensor. For example, row two, column two represents a lean indication by the oxygen sensor.

The first row and third column cell reads "CPV state" and it describes an operating state that the canister purge valve (CPV) is commanded to during a diagnostic. The CPV state may indicate open or closed. The "CPV state" that is indicated at the first row and third column of matrix 600 identifies that subsequent rows falling under column three indicate the state that the CPV is commanded to during the diagnostic.

The first row and fourth column cell reads "CVV1 state" and it describes an operating state that the canister vent valve one (e.g., 310 of FIG. 3) is commanded to during a diagnostic. The CVV1 state may indicate open or closed. The "CVV1" state" that is indicated at the first row and fourth column of matrix 600 identifies that subsequent rows falling under column three indicate the state that the CVV1 is commanded to during the diagnostic.

The first row and fifth column cell reads "CVV2 state" and it describes an operating state that the canister vent valve two (e.g., 312 of FIG. 3) is commanded to during a diagnostic. The CVV2 state may indicate open or closed. The "CVV2" state" that is indicated at the first row and fifth column of matrix 600 identifies that subsequent rows falling under column three indicate the state that the CVV2 is commanded to during the diagnostic.

The first row and sixth column cell reads "CVV3 state" and it describes an operating state that the canister vent valve three (e.g., 314 of FIG. 3) is commanded to during a diagnostic. The CVV3 state may indicate open or closed. The "CVV3" state" that is indicated at the first row and sixth column of matrix 600 identifies that subsequent rows falling under column three indicate the state that the CVV3 is commanded to during the diagnostic.

The first row and seventh column cell reads "Inference" and it describes an inference that may be determined during a diagnostic. The inference may state which carbon filled fuel vapor storage canister is degraded or not degraded. The "Inference" that is indicated at the first row and seventh column of matrix 600 identifies that subsequent rows falling under column seven indicate what inference (e.g., a carbon filled fuel vapor storage canister is degraded or not degraded) may be determined based on the state of bed volume, $O_2$ sensor state, CPV valve state, and CVV states. For example, row three, column seven, indicates that carbon filled fuel vapor storage canister number one or carbon filled fuel vapor storage canister three may be degraded.

A representation of matrix 600 may be stored in controller ROM and a method, such as method 700, may reference matrix 600 to determine which valves to command to command to which state and what inferences may be inferred from bed volume, $O_2$ sensor state, CPV state, and CVV states.

Referring now to FIGS. 7 and 8, an example method 700 for operating a vehicle that includes an evaporative emissions system is shown. At least portions of method 700 may be included in and cooperate with a system as shown in FIGS. 1, 3, and, 4 as executable instructions stored in non-transitory memory. The method of FIGS. 7 and 8 may cause the controller to actuate the actuators in the real world and receive data and signals from sensors described herein when the method is realized as executable instructions stored in controller memory.

At 702, method 700 judges whether or not to diagnose an evaporative emissions system and its carbon filled fuel vapor storage canisters. In one example, method 700 may choose to diagnose the evaporative emissions system after predetermined conditions have been met. The predetermined conditions may include but are not limited to an amount of time since a last most recent evaporative emissions system diagnosis exceeding a threshold amount of time, a predetermined actual total number of most recent engine starts has exceeded a threshold, the carbon filled fuel vapor canisters being filled with fuel vapors, and/or a manual request to diagnose the evaporative emissions system. If method 700 judges that conditions have been met to diagnose the evaporative emissions system, the answer is yes and method 700 proceeds to 704. Otherwise, the answer is no and method 700 proceeds to 703.

At 703, method 700 stores and releases hydrocarbons (e.g., fuel vapors) in one or more fuel vapor storage canisters that are arranged in series and parallel as shown in FIGS. 3 and 4. Carbon filled fuel vapor storage canisters that are arranged in parallel include common ports of two or more carbon filled fuel vapor storage canisters that are coupled via a conduit or passage. For example, in FIG. 3, first carbon filled fuel vapor storage canister 302 is arranged in parallel with second carbon filled fuel vapor storage canister 304 because the load port L1 is directly coupled (e.g., no intervening components other than a conduit or passage) with load port L2. A carbon filled fuel vapor storage canister that is arranged in series with another carbon filled fuel vapor storage canister includes a port that is directly coupled to a port of the other carbon filled fuel vapor storage canister that is not a common ports. For example, in FIG. 3, third carbon filled fuel vapor storage canister 306 is arranged in series with first carbon filled fuel vapor storage canister 302 because the load port L3 is directly coupled (e.g., no intervening components other than a conduit or passage) with load port V1. The hydrocarbons may be stored in the carbon filled fuel vapor storage canisters when a fuel tank is being filled. Hydrocarbons may be released from the carbon filled fuel vapor canister when an engine is operating and combusting air and fuel. Method 700 proceeds to exit.

At 704, method 700 opens a canister purge valve and operates canister vent valves according to initiate a first phase of a carbon filled canister diagnostic. In one example, method 700 may command the canister purge valve and canister vent valves according to values in a matrix (e.g., 500 or 600 in FIGS. 5 and 6). For example, if the system is configured as shown in FIG. 3, the canister purge valve is opened, CVV1 is open, CVV2 is closed, and CVV3 is open as is shown in the first phase of the diagnostic shown in FIG. 6 (e.g., rows 603-605). On the other hand, if the system is configured as shown in FIG. 4, the canister purge valve is opened, CVV1 is open, CVV2 is opened, and CVV3 is closed as is shown in the first phase of the diagnostic shown in FIG. 5 (e.g., rows 503-505). Method 700 also begins to estimate the amount of air that is entering the evaporative emissions system for purging of the carbon filled canisters. Method 700 proceeds to 706.

At 706, method 700 judges whether or not the air flow into the evaporative emissions system is in a first air flow range and if an oxygen sensor in the exhaust system is reading lean while the engine air-fuel ratio is commanded to a stoichiometric value. In other words, is the air flowing through the carbon filled canisters is not being enriched by fuel vapors in the first air flow range? If so, the answer is yes and method 700 indicates that the first and second carbon filled canisters are degraded or that the first and second or first and third carbon filled fuel vapor storage canisters are degraded (e.g., have less than a threshold amount of fuel vapor storage capacity) at 750 as shown at row 2 (503), column 7 (526) in FIG. 5 or as shown at row 2 (603), column 7 (626) in FIG. 6. Method 700 proceeds to 714 from 750. If not, the answer is no and method 700 proceeds to 708.

At 708, method 700 judges whether or not the air flow into the evaporative emissions system is in a second air flow range and if an oxygen sensor in the exhaust system has switched from reading rich to reading lean while the engine air-fuel ratio is commanded to a stoichiometric value. In other words, is the amount of air flowing through the carbon filled canisters in this air flow amount range sufficient to cause a change in oxygen sensor state from reading rich to reading lean? If so, the answer is yes and method 700 may indicate that the first or second carbon filled canister is degraded at 750 as shown at row 3 (504), column 7 (526) in FIG. 5, or that the first or third carbon filled fuel vapor storage canisters is degraded at 750 as shown at row 3 (604), column 7 (626) in FIG. 6. Method 700 proceeds to 714 from 750. If not, the answer is no and method 700 proceeds to 710.

At 710, method 700 judges whether or not the air flow into the evaporative emissions system is in a third air flow range and if an oxygen sensor in the exhaust system has switched from reading rich to reading lean while the engine air-fuel ratio is commanded to a stoichiometric value. In other words, is the amount of air flowing through the carbon filled canisters in this air flow amount range sufficient to cause a change in oxygen sensor state from reading rich to reading lean? If so, the answer is yes and method 700 indicates that the first and second carbon filled fuel vapor storage canisters are good (e.g., functioning as may be expected) at 750 as shown at row 4 (505), column 7 (526) in FIG. 5 or that the first and third carbon filled fuel vapor storage canisters are degraded at 750 as shown at row 4 (605), column 7 (626) in FIG. 6. Method 700 proceeds to 714 from 750. If not, the answer is no and method 700 returns to 706.

At 712, method 700 whether or not the air flow into the evaporative emissions system is greater than that of the third air flow range. If not, the answer is no and method 700 returns to 706. Otherwise, the answer is yes and method 700 proceeds to 714. Additionally, if the answer is yes, method 700 may pause execution until the carbon filled fuel vapor storage canisters are filled again with fuel vapors so that the second phase of the diagnostic may be performed.

At 714, method 700 opens a canister purge valve and operates canister vent valves according to initiate a second phase of a carbon filled canister diagnostic. In one example, method 700 may command the canister purge valve and canister vent valves according to values on a matrix (e.g., 500 or 600 in FIGS. 5 and 6). For example, if the system is configured as shown in FIG. 3, the canister purge valve is opened, CVV1 is closed, CVV2 is open, and CVV3 is open as is shown in the second phase of the diagnostic shown in FIG. 6 (e.g., rows 606-608). On the other hand, if the system is configured as shown in FIG. 4, the canister purge valve is opened, CVV1 is open, CVV2 is closed, and CVV3 is open as is shown in the second phase of the diagnostic shown in FIG. 5 (e.g., rows 506-508). Method 700 also begins to estimate the amount of air that is entering the evaporative emissions system for purging of the carbon filled canisters. Method 700 proceeds to 716.

At 716, method 700 judges whether or not the air flow into the evaporative emissions system is in a first air flow range and if an oxygen sensor in the exhaust system is reading lean while the engine air-fuel ratio is commanded to a stoichiometric value. In other words, is the amount of air flowing through the carbon filled canisters in this air flow amount range sufficient to cause a change in oxygen sensor state from reading rich to reading lean? If so, the answer is yes and method 700 indicates that the first and third carbon filled fuel vapor storage canisters may be degraded at 760 as shown at row 5 (506), column 7 (526) in FIG. 5, or that the second and third carbon filled fuel vapor storage canisters may be degraded as shown at row 5 (606), column 7 (626) in FIG. 6. Otherwise, the answer is no and method 700 proceeds to 718.

At 718, method 700 judges whether or not the air flow into the evaporative emissions system is in a second air flow range and if an oxygen sensor in the exhaust system has switched from reading rich to reading lean while the engine air-fuel ratio is commanded to a stoichiometric value. In other words, is the amount of air flowing through the carbon filled canisters in this air flow amount range sufficient to cause a change in oxygen sensor state from reading rich to reading lean? If so, the answer is yes and method 700 indicates that the first or third carbon filled canister may be degraded at 760 as shown at row 7 (507), column 7 (526) in FIG. 5, or that the second or third carbon filled canister may be degraded at 760 as shown at row 7 (607), column 7 (626) in FIG. 6. Otherwise, the answer is no and method 700 proceeds to 720.

At 720, method 700 judges whether or not the air flow into the evaporative emissions system is in a third air flow range and if an oxygen sensor in the exhaust system has switched from reading rich to reading lean while the engine air-fuel ratio is commanded to a stoichiometric value. In other words, is the amount of air flowing through the carbon filled canisters in this air flow amount range sufficient to cause a change in oxygen sensor state from reading rich to reading lean? If so, the answer is yes and method 700 indicates that the second carbon filled canister is degraded at 760 as shown at row 8 (509), column 7 (526) in FIG. 5 or that the third carbon filled canister is degraded at 750 as shown at row 8 (609), column 7 (626) in FIG. 6. Otherwise, the answer is no and method 700 proceeds to 722.

At 722, method 700 whether or not the air flow into the evaporative emissions system is greater than that of the third air flow range. If not, the answer is no and method 700 returns to 716. Otherwise, the answer is yes and method 700 proceeds to exit. Additionally, if the answer is yes, method 700 may close the canister purge valve and the canister vent valves.

In this way, method 700 may perform a diagnostic of a plurality of carbon filled fuel vapor storage canisters that are arranged in series and in parallel to determine whether or not the carbon filled fuel vapor storage canisters have an expected amount of fuel vapor storage capacity. The method provides for individual determination of degradation in each of the individual carbon filled fuel vapor storage canisters, even when carbon filled fuel vapor canisters are arranged in parallel.

Thus, the method of FIGS. 7 and 8 provides for a method for operating a vehicle, comprising: arranging a plurality of carbon filled fuel vapor storage canisters in parallel and series; and via a controller, indicating a presence or absence of degradation for each of the plurality of carbon filled fuel vapor storage canisters according to a state of an oxygen sensor and a plurality of ranges of air amounts. In a first example, the method includes where arranging the plurality of carbon filled fuel vapor storage canisters in parallel and series includes arranging two carbon filled fuel vapor storage canisters in parallel, and arranging one carbon filled fuel vapor storage canister in series with the two carbon filled fuel vapor storage canisters. In a second example that may include the first example, the method includes where the flow ranges quantify an amount of air that has flowed through the plurality of carbon filled fuel vapor storage canisters. In a third example that may include one or both of the first and second examples, the method includes where the state of the oxygen sensor is indicating a lean air-fuel mixture. In a fourth example that may include one or more of the first through third examples, the method includes where the state of the oxygen sensor switches from indicating a rich air-fuel mixture to indicating a lean air-fuel mixture. In a fifth example that may include one or more of the first through fourth examples, the method further comprises providing an open canister purge valve, two closed canister vent valves, and one open canister vent valve in response to a request to diagnose operation of the plurality of carbon filled fuel vapor storage canisters in a first diagnostic phase. In a sixth example that may include one or more of the first through fifth examples, the method further comprises providing an open canister purge valve, one closed canister vent valve, and two open canister vent valves in response to the request to diagnose operation of the plurality of carbon filled fuel vapor storage canisters in a second diagnostic phase. In a seventh example that may include one or more of the first through sixth examples, the method includes where the plurality of ranges of air amounts are air amounts that flow into the carbon filled fuel vapor storage canisters.

The method of FIGS. 7 and 8 also provides for a method for operating a vehicle, comprising: via a controller, diagnosing whether or not a fuel vapor storage capacity of each of a plurality of carbon filled fuel vapor storage canisters in an evaporative emissions system is less than a threshold in response to a request to diagnose the plurality of carbon filled fuel vapor storage canisters. In a first example, the method further comprises opening a canister purge valve and adjusting operation states of a plurality of canister vent valves in response to the request to diagnose the plurality of carbon filled fuel vapor storage canisters. In a second example that may include the first example, the method includes where adjusting operation states of the plurality of canister vent valves includes opening the first canister vent valve, closing or holding closed a second canister vent valve, and opening a first canister vent valve in a first diagnostic phase. In a third method that may include one or both of the first and second examples, the method includes where adjusting operation states of the plurality of canister vent valves includes closing the first canister vent valve, opening a second canister vent valve, and holding open the first canister vent valve in a second diagnostic phase. In a fourth example that may include one or more of the first through third examples, the method includes where the diagnosis is based on an amount of gas flow into the plurality of carbon filled fuel vapor storage canisters.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:

arranging a plurality of carbon filled fuel vapor storage canisters in parallel and series such that load ports of the plurality of carbon filled fuel vapor storage canisters are arranged in parallel and series;

providing an open canister purge valve, two closed canister vent valves, and one open canister vent valve in response to a request to diagnose operation of the plurality of carbon filled fuel vapor storage canisters in a first diagnostic phase;

providing the open canister purge valve, one closed canister vent valve, and two open canister vent valves in response to the request to diagnose operation of the plurality of carbon filled fuel vapor storage canisters in a second diagnostic phase; and via a controller, indicating a presence or absence of degradation for each of the plurality of carbon filled fuel vapor storage canisters according to a state of an oxygen sensor and a plurality of ranges of air amounts.

2. The method of claim 1, where arranging the plurality of carbon filled fuel vapor storage canisters in parallel and series includes arranging two carbon filled fuel vapor storage canisters in parallel, and arranging one carbon filled fuel vapor storage canister in series with the two carbon filled fuel vapor storage canisters.

3. The method of claim 1, where the flow ranges quantify an amount of air that has flowed through the plurality of carbon filled fuel vapor storage canisters.

4. The method of claim 1, where the state of the oxygen sensor is indicating a lean air-fuel mixture.

5. The method of claim 1, where the state of the oxygen sensor switches from indicating a rich air-fuel mixture to indicating a lean air-fuel mixture.

6. The method of claim 1, where the plurality of ranges of air amounts are air amounts that flow into one or more of the plurality of carbon filled fuel vapor storage canisters.

7. A vehicle system, comprising:

a plurality of carbon filled fuel vapor storage canisters including a first group of carbon filled fuel vapor storage canisters arranged in parallel and a second group of carbon filled fuel vapor storage canisters arranged in series, where the first group of carbon filled canisters includes load ports arranged in parallel, and where the second group of carbon filled canisters includes load ports arranged in series;

a fuel tank;

an oxygen sensor;

a canister purge valve;

a first canister vent valve, a second canister vent valve, and a third canister vent valve; and a controller including executable instructions stored in non-transitory memory that cause the controller to:

open the canister purge valve, open the first canister vent valve, close the second canister vent valve, and open the third canister vent valve in response to the request to diagnose the plurality of carbon filled fuel vapor storage canisters in a first diagnostic phase;

hold open the canister purge valve, close the first canister vent valve, open the second canister vent valve, and hold open the third canister vent valve in response to the request to diagnose the plurality of carbon filled fuel vapor storage canisters in a second diagnostic phase; and indicate a presence or absence of degradation for each of the plurality of carbon filled fuel vapor storage canisters in response to a request to diagnose the plurality of carbon filled fuel vapor storage canisters.

8. The vehicle system of claim 7, where the presence or absence of degradation for each of the plurality of carbon filled fuel vapor storage canisters is based on a state of the oxygen sensor and a plurality of ranges of air amounts.

9. The vehicle system of claim 7, where a state of the oxygen sensor remains indicating a lean air-fuel ratio.

10. The vehicle system of claim 7, where a state of the oxygen sensor switches from indicating a rich air-fuel ratio to indicating a lean air-fuel ratio.

11. The vehicle system of claim 7, where the first group of carbon filled fuel vapor storage canisters are in direct fluidic communication with the canister purge valve.

12. A method for operating a vehicle, comprising:

via a controller, in response to a request to diagnose the plurality of carbon filled fuel vapor storage canisters, opening a canister purge valve and opening a first canister vent valve, closing or holding closed a second canister vent valve, and opening a first canister vent valve in a first diagnostic phase;

opening the canister purge valve, closing the first canister vent valve, opening a second canister vent valve, and holding open the first canister vent valve in a second diagnostic phase; and diagnosing whether or not a fuel vapor storage capacity of each of a plurality of carbon filled fuel vapor storage canisters in an evaporative emissions system is less than a threshold.

13. The method of claim 12, where a diagnosis of the plurality of carbon filled fuel vapor storage canisters is based on an amount of gas flow into the plurality of carbon filled fuel vapor storage canisters.

* * * * *